United States Patent [19]
Iino et al.

[11] Patent Number: 5,531,469
[45] Date of Patent: Jul. 2, 1996

[54] AIR BAG HOUSING PAD COVER AND PRODUCTION THEREOF

[75] Inventors: Yasuhiro Iino, Kodaira; Yosuke Matsushima, Sagamihara; Tomozane Terazawa, Kodaira; Shozo Sugiki, Yokohama, all of Japan

[73] Assignee: Bridgestone Corporation, Tokyo, Japan

[21] Appl. No.: 262,456

[22] Filed: Jun. 20, 1994

[30] Foreign Application Priority Data

Jun. 18, 1993 [JP] Japan ..................... 5-147697

[51] Int. Cl.⁶ .................................................. B60R 21/16
[52] U.S. Cl. ............................................... 280/728.3
[58] Field of Search ............... 280/728.3, 728.1, 280/743.1

[56] References Cited

U.S. PATENT DOCUMENTS

| | | | |
|---|---|---|---|
| 4,246,213 | 1/1981 | Takamatsu et al. | 264/46.7 |
| 5,179,132 | 1/1993 | Mizuno et al. | 521/174 |
| 5,344,183 | 9/1984 | Hersman | 280/728. |

FOREIGN PATENT DOCUMENTS

| | | | |
|---|---|---|---|
| 0432766 | 6/1991 | European Pat. Off. | 280/728.3 |
| 2053576 | 4/1992 | Japan | 280/728.3 |
| 5104547 | 4/1993 | Japan . | |
| 585294 | 4/1993 | Japan . | |
| 2254618 | 10/1992 | United Kingdom . | |
| 2263667 | 8/1993 | United Kingdom | 280/728.3 |

Primary Examiner—Christopher P. Ellis
Attorney, Agent, or Firm—Sughrue, Mion, Zinn, Macpeak & Seas

[57] ABSTRACT

An air bag housing pad cover which is light in weight and soft to the touch and opens in case of crash with certainty over a broad temperature range. A method of producing the air bag housing pad cover efficiently in high yields from a compound composed of a thermoplastic elastomer and a light filler in an amount of 5 to 50 vol % of the compound, the former having a tensile strength higher than 100 kg/cm² and a Shore indentation hardness lower than 55 D, and the latter having a true specific gravity lower than 0.7 and a compression strength higher than 50 kg/cm².

18 Claims, 2 Drawing Sheets

COMPARATIVE EXAMPLE

AIR BAG HOUSING PAD COVER AND PRODUCTION THEREOF

BACKGROUND OF THE INVENTION

1. Field of the Invention

The present invention relates to an air bag housing pad cover in which is housed an air bag to protect vehicle occupants. More particularly it relates to an air bag housing pad cover which, in case of crash, rapidly breaks and opens without obstruction to the inflation of the air bag. The present invention also relates to a method for producing such an air bag housing pad cover. The air bag housing pad cover is provided in a steering wheel, front instrument panel or front door trim of automobiles and other vehicles.

2. Description of the Prior Art

Air bag housing pad covers in general use are made of foamed polyurethane incorporated with reinforcement (such as net and cloth). However, this material is poor in productivity and yield because it requires a long time to embed reinforcement and involves difficulties in embedding reinforcement at a desired position.

There are air bag housing pad covers of a double-wall structure. One is made up of an outer layer of soft resin and an inner layer of hard resin which are integrally formed. The inner layer has a slit to facilitate opening. Another is made up of inner and outer layers of thermoplastic elastomer. The thermoplastic elastomer for the inner layer has a higher 100% tensile stress than that for the outer layer. The inner layer has a groove along which the pad breaks and also has a groove around which the pad swings open. The outer layer has a groove along which the pad breaks.

The above-mentioned air bag housing pad covers of double-wall structure have several disadvantages. The inner layer with a groove has to be thin to facilitate breaking. This leads to difficulties in molding. The outer layer also has to be thin to reduce weight. The reduced thickness makes the groove visible from outside, aggravating the appearance. Moreover, the double-wall structure requires that injection molding be carried out twice with two molds for the inner and outer layers. This leads to a longer production time and an increased production cost.

On the other hand, there have been proposed air bag housing pad covers different than mentioned above. They include one which is formed from an ester—or olefin—based thermoplastic elastomer by injection molding and has a groove to facilitate breaking. They also include one which is formed from a low-density material, such as a cellular material expanded by a blowing agent at the time of injection molding or a thermosetting resin (e.g., unsaturated polyester resin and epoxy resin) incorporated with a light filler (e.g., hollow glass balloons).

The conventional air bag housing pad covers mentioned above have their respective disadvantages. The one made from an ester—or olefin—based thermoplastic elastomer feels harsh because the material has to be hard to ensure firm mounting. The one made from an olefin-based thermoplastic elastomer is so brittle at low temperatures that it breaks even at thick-wall parts. The one made from a urethane-based thermoplastic elastomer is heavy (due to its higher density than other thermoplastic elastomers) and has such a great tensile strength and elongation that is needs a large amount of energy for its opening. The one made from a gas-blown material has a thin-wall part (1 mm or less) for the groove which lacks the cellular structure and hence has an undesirably high tensile strength and elongation for its opening.

SUMMARY OF THE INVENTION

It is an object of the present invention to provide an air bag housing pad cover and a method for producing the same. The air bag housing pad cover of the present invention is light in weight and soft to the touch and opens in case of crash with certainty over a broad temperature range. The method of the present invention permits the efficient production of the air bag housing pad cover in high yields.

The present invention is embodied in an air bag housing pad cover which is formed from a compound composed of a thermoplastic elastomer and a light filler in an amount of 5 to 50 vol % of the compound, the former having a tensile strength higher than 100 $kg/cm^2$ and a Shore indentation hardness lower than 55 D, and the latter having a true specific gravity (measured by ASTM D2480 method) lower than 0.7 and a compression strength (measured by ASTM D3102 method) higher than 50 $kg/cm^2$. The air bag housing pad cover is light in weight and soft to the touch and opens with certainty without requiring a large amount of energy over a broad temperature range. The present invention is also embodied in a method of producing an air bag housing pad cover wherein the raw material is a compound composed of a thermoplastic elastomer and a light filler in an amount of 5 to 50 vol % of the compound, the former having a tensile strength higher than 100 $kg/cm^2$ and a Shore indentation hardness lower than 55 D, and the latter having a true specific gravity lower than 0.7 and a compression strength higher than 50 $kg/cm^2$.

DESCRIPTION OF THE PREFERRED EMBODIMENTS

Figure 1:
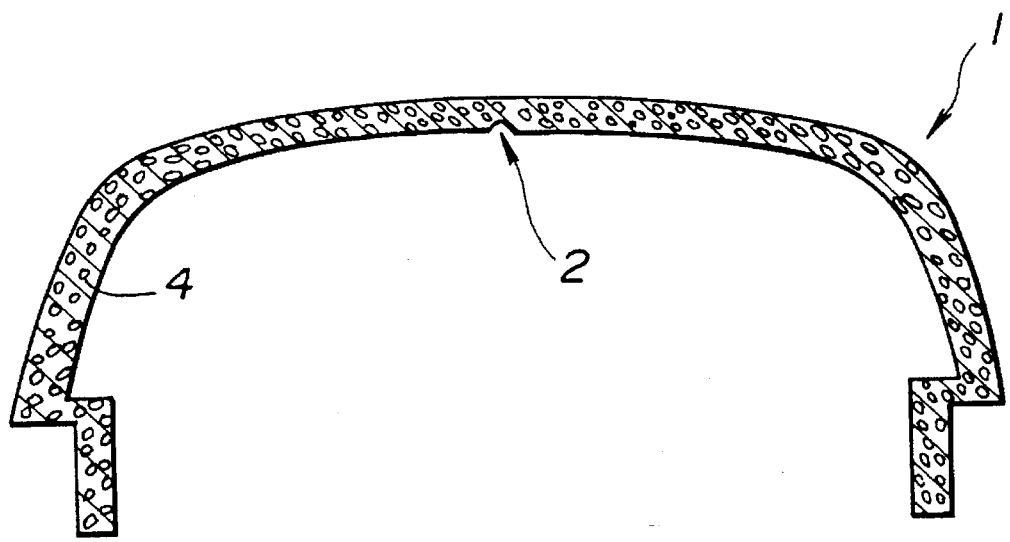
FIG. 1 is a schematic sectional view of an air bag housing pad cover pertaining to one embodiment of the present invention.

According to a preferred embodiment of the present invention, the thermoplastic elastomer is one which is composed mainly of polyurethane and the light filler is one which contains hollow glass balloons.

The thermoplastic elastomer used in the present invention is not specifically restricted so long as it has a tensile strength higher than 100 $kg/cm^2$, preferably 150 to 600 $kg/cm^2$, more preferably 200 to 400 $kg/cm^2$ and a Shore indentation hardness lower than 55 D, preferably 60 A to 54 D, more preferably 70 A to 95 A. It includes one elastomer or a mixture of two or more elastomers selected from urethane-based elastomers (composed mainly of polyurethane), styrene-based elastomers and hydrogenated products thereof (composed mainly of polystyrene), vinyl chloride-based elastomers (composed mainly of polyvinyl chloride), polyester-based elastomers (composed mainly of polyester), polyamide-based elastomers (composed mainly of polyamide), and olefin-based elastomers having a Shore indentation hardness lower than 90 A (composed mainly of polyethylene or polypropylene). The urethane-based elastomers should preferably be those of ether type, ester type, or polycarbonate type.

With a Shore indentation hardness higher than 55 D, the elastomer in pellet form is so hard that it crashes the hollow glass balloons (as the filler having a compression strength higher than 50 kg/cm$^2$) during compounding.

The elastomer may optionally be incorporated with a variety of additives such as flame retardant, antioxidant, antistatic agent, coloring agent, UV light absorber, and plasticizer.

Examples of the flame retardant include inorganic ones (such as antimony trioxide, aluminum hydroxide, magnesium hydroxide, antimony pentoxide, and zirconium oxide), phosphorus-based ones (such as phosphate esters and halogen-containing phosphate esters), and bromine—or chlorine—based ones (such as brominated or chlorinated paraffin and perchlorocyclodecane).

Examples of the antioxidant include chain stoppers (such as light stabilizers, metal deactivators, and antiozonants), radical traps (such as phenol-type antioxidants and amine-type antioxidants), and peroxide decomposers (such as sulfur-based antioxidants and phosphorus-based antioxidants).

Examples of the antistatic agent include surface active agents and polymers having functional groups.

Examples of the coloring agent include organic and inorganic pigments and dyes. Examples of the organic pigments include azo pigments (such as slightly soluble azo lake), phthalocyanine pigments (such as phthalocyanine blue), threne pigments (such as anthraquinone), and lake pigments (such as basic dye). Examples of the inorganic pigments include oxide pigments (such as titanium oxide), chromate and molybdate pigments (such as chrome yellow), sulfide and selenide pigments (such as cadmium yellow), and ferrocyanide pigments (such as Prussian blue). Examples of the dyes include oil-soluble and water-soluble dyes (such as azo dyes, anthraquinone dyes, and quinophthalone dyes).

Examples of the UV light absorber include those derived from salicylate, benzophenone, benzotriazole, cyanoacrylate, and nickel chelate.

Examples of the plasticizer include those derived from phthalic acid, fatty acid, phosphoric acid, adipic acid, polyester, and epoxy compound.

The light filler (4) used in the present invention is not specifically restricted so long as it has a true specific gravity lower than 0.7 and a compression strength higher than 50 kg/cm$^2$, preferably 50 to 1000 kg/cm$^2$, more preferably 100 to 500 kg/cm$^2$. With a true specific gravity higher than 0.7, it is not effective in reducing the weight of the air bag housing pad cover. With a compression strength lower than 50 kg/cm$^2$, it is easily crashed during melt compounding with the thermoplastic elastomer. This leads to an increase in the weight of the air bag housing pad cover.

Examples of the light filler (4) include inorganic hollow balloons of silicate and non-silicate substance and organic hollow balloons of thermoplastic or thermosetting material. Preferred examples include inorganic hollow silicate balloons such as glass balloons (4), silas balloons, fly ash balloons, pearlite balloons and silica balloons. Hollow glass balloons are the most desirable of all. They should preferably have a true specific gravity of 0.28 to 0.6, preferably 0.3 to 0.5, a smooth surface with a minimum of surface porosity, and an easily wettable surface. With a true specific gravity lower than 0.28, hollow glass balloons have a compression strength lower than 50 kg/cm$^2$ and hence they are broken during compounding with the thermoplastic elastomer. This leads to a heavy air bag housing pad cover. With a true specific gravity higher than 0.6, hollow glass balloons result in a heavy air bag housing pad cover.

The hollow glass balloons (4) should preferably have an average particle diameter smaller than 100 μm, preferably 10 to 80 μm, more preferably 40 to 70 μm; otherwise, they are easily broken during compounding with the thermoplastic elastomer. This leads to a heavy air bag housing pad cover.

According to the present invention, it is necessary to use the light filler (4) in such an amount that the filled thermoplastic elastomer decreases in tensile strength to 15 to 90% of that of the virgin thermoplastic elastomer. To this end, the amount of the light filler should be 5 to 50 vol %, preferably 10 to 30 vol % of the entire compound of the thermoplastic elastomer. An amount less than 5 vol % is too small for the filler to yield the air bag housing pad cover having a lowered tensile strength. An amount in excess of 50 vol % will lead to an unpractically low tensile strength.

The air bag housing pad cover of the present invention may undergo surface coating to improve its appearance and durability. A urethane coating is preferable although it is not limitative.

According to the present invention, the air bag housing pad cover is produced from a compound composed of a thermoplastic elastomer having a Shore indentation hardness lower than 55 D and a light filler (3) having a true specific gravity lower than 0.7 and a compression strength higher than 50 kg/cm$^2$.

According to one embodiment of the present invention, the compound is prepared by melt-mixing the thermoplastic elastomer and light filler using a single—or twin—screw extruder and pelletizing the resulting mixture. The air bag housing pad cover is produced by injection molding from the compound (in pellet form).

According to another embodiment of the present invention, the thermoplastic elastomer and light filler are fed directly into an injection molding machine so that they undergo melt-mixing therein while they are metered and transferred forward as the screw rotates. The melt is formed into the air bag housing pad cover.

According to the present invention, it is possible to produce an air bag housing pad cover with a thin-wall part (1 mm or less) while keeping its specific gravity low.

FIG. 1 is a schematic sectional view of an air bag housing pad cover pertaining to one embodiment of the present invention. The air bag housing pad cover (1) has a groove (2) formed in its internal surface so that it readily opens in case of crash. The light filler is shown by numeral (4).

Figure 2:
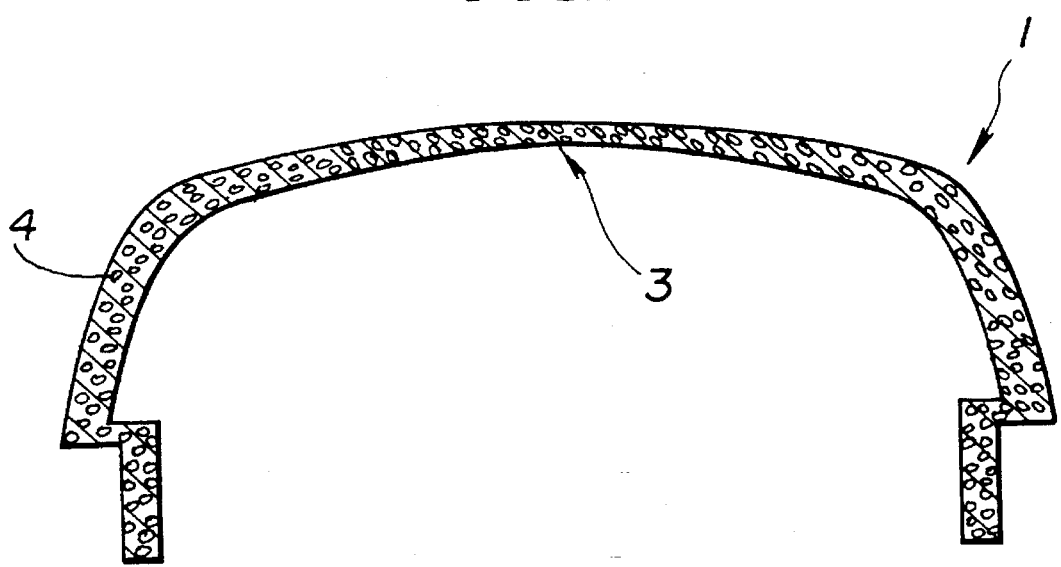
FIG. 2 is a schematic sectional view of an air bag housing pad cover pertaining to another embodiment of the present invention.
Figure 3:
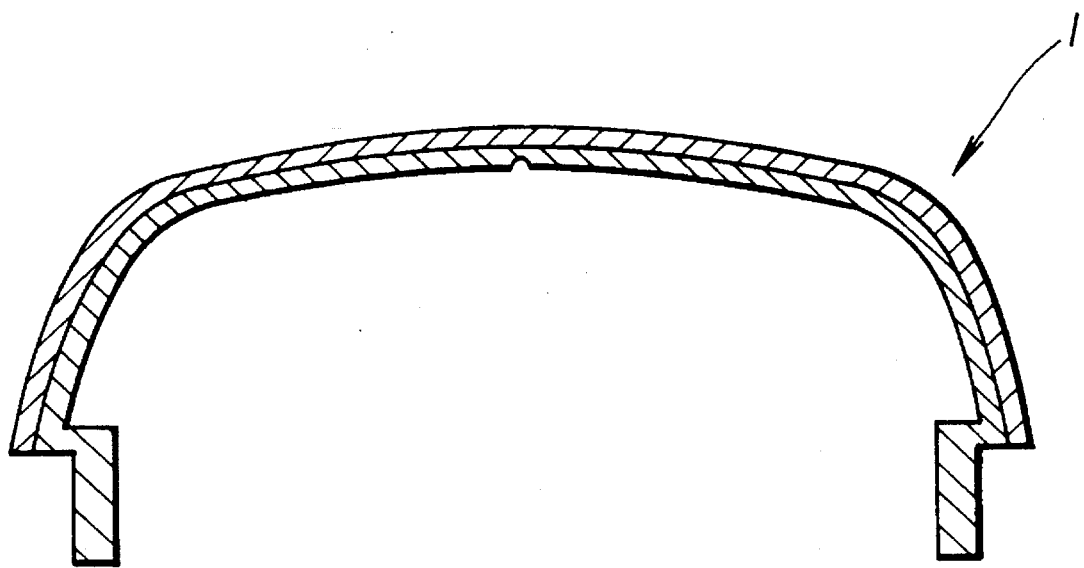
FIG. 3 is a schematic sectional view of an air bag housing pad cover in a Comparative Example.

FIG. 2 is a schematic sectional view of an air bag housing pad cover pertaining to another embodiment of the present invention. The air bag housing pad cover (1) has a thin-wall part (3) formed in its internal surface so that it readily opens in case of crash.

EXAMPLES

The invention will be more clearly understood with reference to the following Examples.

Example 1

A molding compound was prepared from ether-urethane thermoplastic elastomer and hollow glass balloon fillers by melt-mixing. The elastomer has a Shore indentation hardness of 79 A, a tensile strength of 290 kg/cm$^2$, and a specific gravity of 1.12. The filler has a true specific gravity of 0.38 and a compression strength of 281 kg/cm$^2$. The melt-mixing was accomplished by extrusion at a cylinder temperature of 160° to 200° C. and a screw speed of 100 rpm. The mixture was pelletized into cylindrical pieces, 2 mm in diameter and 5 mm high.

The thermoplastic elastomer compound in pellet form was injection-molded into an air bag housing pad cover. The injection molding was accomplished at a cylinder temperature of 180° to 200° C., a screw speed of 50 rpm, and a maximum pressure of 140 kg/cm$^2$. The air bag housing pad cover has a wall thickness of 4.0 mm, partly grooved such that the wall thickness is reduced to 0.5 mm as shown in FIG. 1. This groove facilitates the opening of the air bag housing pad cover in case of crash. Incidentally, the content of the filler in the air bag housing pad cover was 20 vol %.

The air bag housing pad cover thus formed was examined for specific gravity and tensile strength. The specific gravity was found to be 1.04 throughout and the tensile strength was found to be 140 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The thus obtained air bag housing pad cover was tested by an inflator to determine if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 2

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The thus formed air bag housing pad cover was examined for specific gravity and tensile strength. The specific gravity was found to be 1.04 throughout and the tensile strength was found to be 145 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The thus obtained air bag housing pad cover was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 3

An injection molding machine was fed with olefin thermoplastic elastomer and hollow glass balloon fillers. The elastomer has a Shore indentation hardness of 80 A, a tensile strength of 117 kg/cm$^2$, and a specific gravity of 0.97. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The thus formed air bag housing pad cover was examined for specific gravity and tensile strength. The specific gravity was found to be 0.93 throughout and the tensile strength was found to be 58 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained, was tested by an inflator to see if it readily opens at temperatures ranging from −40° C. to 90° C. It opens in an invariable manner without breaking except at the groove.

Incidentally, the air bag housing pad cover resembles in touch the one made from foamed polyurethane by reaction injection molding (RIM).

Example 4

An injection molding machine was fed with hydrogenated styrene thermoplastic elastomer and hollow glass balloon fillers. The elastomer has a Shore indentation hardness of 80 A, a tensile strength of 105 kg/cm$^2$, and a specific gravity of 0.90. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus formed was examined for specific gravity and tensile strength. The specific gravity was found to be 0.86 throughout and the tensile strength was found to be 52 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained, was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 5

An injection molding machine was fed with ether-urethane thermoplastic elastomer and hollow glass balloon fillers. The elastomer has a Shore indentation hardness of 53 D (98 A), a tensile strength of 420 kg/cm$^2$, and a specific gravity of 1.12. The filler has a true specific gravity of 0.60 and a compression strength of 703 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus formed was examined for specific gravity and tensile strength. The specific gravity was found to be 1.04 throughout and the tensile strength was found to be 203 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 6

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.25 and a compression strength of 52.5 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus formed was examined for specific gravity and tensile strength. The specific gravity was found to be 0.95 throughout and the tensile strength was found to be 143 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 7

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 10 vol %.

The air bag housing pad cover thus formed was examined for specific gravity and tensile strength. The specific gravity was found to be 1.07 throughout and the tensile strength was found to be 210 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Example 8

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 45 vol %.

The air bag housing pad cover thus formed was examined for specific gravity and tensile strength. The specific gravity was found to be 0.96 throughout and the tensile strength was found to be 95 kg/cm$^2$ throughout, both regardless of the thick part (4 mm) of the wall and the thin part (0.5 mm) of the groove. It should be noted that the measured values of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The air bag housing pad cover thus obtained, was tested by an inflator to see if it readily opens at temperatures ranging from −40° C. to 90° C. It opened in an invariable manner without breaking except at the groove.

Incidentally, the air bag housing pad cover resembles in touch the one made from foamed polyurethane by reaction injection molding (RIM).

Comparative Example 1

An injection molding machine was fed with an ether-urethane thermoplastic elastomer which has a Shore indentation hardness of 79 A, a tensile strength of 290 kg/cm$^2$, and a specific gravity of 1.12. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1.

The air bag housing pad cover thus obtained was tested by an inflator to see if it readily opens at temperatures ranging from −40° C. to 90° C. It did not open but it broke at its mounting part because the groove has an excessively high strength and elongation.

Comparative Example 2

An injection molding machine was fed with an ether-urethane thermoplastic elastomer together with 2 parts by weight of blowing agent (azodicarbonamide). The elastomer has a Shore indentation hardness of 79 A, a tensile strength of 290 kg/cm$^2$, and a specific gravity of 1.12. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1.

The air bag housing pad cover thus formed was examined for specific gravity and tensile strength. The specific gravity was found to be 1.02 in the thick wall part and 1.02 in the thin wall part (groove), and the tensile strength was found to be 250 kg/cm$^2$. It should be noted that the measured values of specific gravity are not so lower than the original value of the thermoplastic elastomer as the base material. The thin-wall part (groove) was observed using an electron microscope (×350). It was found that foaming therein is insufficient.

The air bag housing pad cover thus obtained was tested by an inflator to see if it readily opens at temperatures ranging from −40° C. to 90° C. It did not open but it broke at its mounting part because the groove has an excessively high strength and elongation.

Comparative Example 3

An injection molding machine was fed with ether-urethane thermoplastic elastomer and hollow glass balloons. The elastomer has a Shore indentation hardness of 57 D, a tensile strength of 527 kg/cm$^2$, and a specific gravity of 1.15. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus obtained was examined for specific gravity and tensile strength. The specific gravity was found to be 1.18 throughout and the tensile strength was found to be 360 kg/cm$^2$ throughout, both regardless of the thick part (4 mm) of the wall and the thin part (0.5 mm) of the groove. It should be noted that the measured value of specific gravity is higher than the original value of the thermoplastic elastomer as the base material. The thick part of the wall and the thin part of the groove were observed using an electron microscope (×350). It was found that the filler (hollow glass balloons) was broken due to shear stress exerted by injection molding.

The air bag housing pad cover thus obtained was tested by an inflator to see if it readily opens at temperatures ranging from −40° C. to 90° C. It did not open but it broke at its mounting part because the groove has an excessively high strength.

Comparative Example 4

An injection molding machine was fed with ether-urethane thermoplastic elastomer and hollow glass balloon fillers. The elastomer has a Shore indentation hardness of 57 D, a tensile strength of 527 kg/cm$^2$, and a specific gravity of 1.15. The filler has a true specific gravity of 0.60 and a compression strength of 703 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus obtained was examined for specific gravity and tensile strength. The specific gravity was found to be 1.18 throughout and the tensile strength was found to be 350 kg/cm$^2$ throughout, both regardless of the thick part (4 mm) of the wall and the thin part (0.5 mm) of the groove. It should be noted that the measured value of specific gravity is higher than the original value of the thermoplastic elastomer as the base material. The thick part of the wall and the thin part of the groove were observed using an electron microscope (×350). It was found that the filler (hollow glass balloons) was broken due to shear stress exerted by injection molding.

The air bag housing pad cover was tested by an inflator to see if it readily opens at temperatures ranging from −40° C. to 90° C. It did not open but it broke at its mounting part because the groove has an excessively high strength.

Comparative Example 5

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.125 and a compression strength of 17.6 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 20 vol %.

The air bag housing pad cover thus obtained was examined for specific gravity and tensile strength. The specific gravity was found to be 1.40 throughout and the tensile strength was found to be 210 kg/cm$^2$ throughout, both regardless of the thick part (4 mm) of the wall and the thin part (0.5 mm) of the groove. The thick part of the wall and the thin part of the groove were observed using an electron microscope (×350). It was found that the filler (hollow glass balloons) was broken due to shear stress exerted by injection molding.

The air bag housing pad cover was tested by an inflator to see if it readily opens at temperatures ranging from –40° C. to 90° C. It did not open but it broke at its mounting part because the groove has an excessively high strength.

Comparative Example 6

An injection molding machine was fed with a crosslinked olefin thermoplastic elastomer which has a Shore indentation hardness of 92 A, a tensile strength of 161 kg/cm$^2$, and a specific gravity of 0.95. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1.

The air bag housing pad cover thus obtained was tested by an inflator to see if it readily opens at temperatures ranging from –40° C. to 90° C. It broke at its thick-wall part due to brittle fracture at –40° C. In addition, it felt hard to the touch.

Comparative Example 7

An injection molding machine was fed with ether-urethane thermoplastic elastomer and hollow glass balloon fillers. The elastomer has a Shore indentation hardness of 79 A, a tensile of 290 kg/cm$^2$, and a specific gravity of 1.12. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 2 vol %.

The air bag housing pad cover thus obtained was examined for specific gravity and tensile strength. The specific gravity was found to be 1.11 throughout and the tensile strength was found to be 280 kg/cm$^2$ throughout, both regardless of the thick part (4 mm) of the wall and the thin part (0.5 mm) of the groove. The thick part of the wall and the thin part of the groove were observed using an electron microscope (×350). It was found that the filler (hollow glass balloons) remained intact despite shear stress exerted by injection molding.

The air bag housing pad cover thus obtained was tested by an inflator to see if it readily opens at temperatures ranging from –40° C. to 90° C. It did not open but it broke at it mounting part because the groove has an excessively high strength and elongation.

Comparative Example 8

An injection molding machine was fed with ether-urethane thermoplastic elastomer and hollow glass balloon fillers. The elastomer has a Shore indentation hardness of 79 A, a tensile strength of 290 kg/cm$^2$, and a specific gravity of 1.12. The filler has a true specific gravity of 0.38 and a compression strength of 281 kg/cm$^2$. The injection molding was accomplished at a cylinder temperature of 180° to 200° C., a screw speed of 50 rpm, and a maximum pressure of 140 kg/cm$^2$ to give an air bag housing pad cover having a wall thickness of 4.0 mm, partly grooved such that the wall thickness is reduced to 0.5 mm as shown in FIG. 1. Incidentally, the content of the filler in the air bag housing pad cover was 55 vol %.

The air bag housing pad cover thus formed was examined for specific gravity and tensile strength. The specific gravity was found to be 0.90 throughout and the tensile strength was found to be 40 kg/cm$^2$ throughout, both regardless of the thick part (4 mm) of the wall and the thin part (0.5 mm) of the groove. It should be noted that the measured value of specific gravity and tensile strength are lower than the original values of the thermoplastic elastomer as the base material. The thick part of the wall and the thin part of the groove were observed using an electron microscope (×350). It was found that the filler (hollow glass balloons) remained intact despite shear stress exerted by injection molding.

The thus obtained air bag housing pad cover was tested by an inflator to see if it readily opens at temperatures ranging from –40° C. to 90° C. It did not open but it broke at its mounting part because the groove has an excessively high strength.

The foregoing Examples and Comparative Examples demonstrate that the air bag housing pad cover readily opens at –40° to 90° C. and has a smooth touch if it is made by injection molding from a thermoplastic elastomer compound composed of a thermoplastic elastomer and a light filler (5 to 50 vol % of the compound), the former having a tensile strength higher than 100 kg and a Shore indentation hardness lower than 55 D, the latter having a true specific gravity lower than 0.7 and a compression strength higher than 50 kg/cm$^2$. The air bag housing pad cover contains the light filler which remains intact despite shear stress exerted by injection molding. In addition, it has a uniform tensile strength and specific gravity throughout its wall regardless of its wall thickness, which are lower than the original values of the base material.

As mentioned above, the air bag housing pad cover of the present invention is light in weight and soft to the touch and opens in case of crash with certainty over a broad temperature range, The method of the present invention permits the efficient production of the air bag housing pad cover in high yields.

Japanese Patent Application No. 5-147697 is incorporated herein by reference.

What is claimed is:

1. An air bag housing pad cover which is formed as a single-layer structure from a compound composed of a thermoplastic elastomer and a light filler in an amount of 5 to 50 vol % of the compound, the thermoplastic elastomer having a tensile strength higher than 100 kg/cm$^2$ and a Shore indention hardness lower than 55 D, and the light filler having a true specific gravity lower than 0.7 and a compression strength higher than 50 kg/cm$^2$.

2. An air bag housing pad cover as defined in claim 1, wherein the thermoplastic elastomer is one which is composed mainly of urethane and the light filler is composed of hollow glass balloons.

3. A method of producing an air bag housing pad cover formed as a single layer structure wherein the raw material is a compound composed of a thermoplastic elastomer and a light filler in an amount of 5 to 50 vol % of the compound, the thermoplastic elastomer having a tensile strength higher than 100 kg/cm$^2$ and a Shore indentation hardness lower than 55 D, and the light filler having a true specific gravity lower than 0.7 and a compression strength higher than 50 kg/cm$^2$.

4. A method of producing an air bag housing pad cover as defined in claim 3, wherein the thermoplastic elastomer is one which is composed mainly of urethane and the light filler is composed of hollow glass balloons.

5. An air bag housing pad cover which is formed from a compound composed of a thermoplastic elastomer and a light filler in an amount of 5 to 50 vol % of the compound, the thermoplastic elastomer having a tensile strength higher than 100 kg/cm$^2$ and a Shore indentation hardness lower than 55 D and the light filler having a true specific gravity lower than 0.7 and a compression strength higher than 50 kg/cm$^2$, wherein the thermoplastic elastomer is one which is composed mainly of urethane and the light filler is composed of hollow glass balloons.

6. A method of producing an air bag housing pad cover wherein the raw material is a compound composed of a thermoplastic elastomer and a light filler in an amount of 5 to 50 vol % of the compound, the thermoplastic elastomer having a tensile strength higher than 100 kg/cm$^2$ and a Shore indentation hardness lower than 55 D, and the light filler having a true specific gravity lower than 0.7 and a compression strength higher than 50 kg/cm$^2$, wherein the thermoplastic elastomer is one which is composed mainly of urethane and the light filler is composed of hollow glass balloons.

7. An air bag housing cover according to claim 1, wherein the tensile strength of the thermoplastic elastomer is in the range of 150 to 600 kg/cm$^2$.

8. An air bag housing cover according to claim 1, wherein said thermoplastic elastomer has a shore indentation hardness in the range of 60 A to 54 D.

9. An air bag housing cover according to claim 1, wherein said thermoplastic elastomer includes an additive selected from the group consisting of a flame retardant, antioxidant, antistatic agent, coloring agent, UV light absorber and plasticizer.

10. An air bag housing cover of claim 1, wherein said light filler has a compression strength in the range of 50 to 1000 kg/cm$^2$.

11. An air bag housing cover of claim 2, wherein said hollow glass balloons have a true specific gravity in the range of 0.28 to 0.6.

12. An air housing cover of claim 2, wherein said hollow glass balloons have an average particle diameter in the range of 10 to 80 µm.

13. A method of producing an air bag pad cover of claim 3, wherein the tensile strength of the thermoplastic elastomer is in the range of 150 to 600 kg/cm$^2$.

14. A method of producing an air bag pad cover of claim 3, wherein said thermoplastic elastomer has a shore indentation hardness in the range of 60 A to 54 D.

15. A method of producing an air bag pad cover of claim 3, wherein said thermoplastic elastomer includes an additive selected from the group consisting of a flame retardant, antioxidant, antistatic agent, coloring agent, UV light absorber and plasticizer.

16. A method of producing an air bag pad cover of claim 3, wherein said light filler has a compression strength in the range of 50 to 1000 kg/cm$^2$.

17. A method of producing an air bag pad cover of claim 4, wherein said hollow glass balloons have a true specific gravity in the range of 0.28 to 0.6.

18. A method of producing an air bag pad cover of claim 4, wherein said hollow glass balloons have an average particle diameter in the range of 10 to 80 µm.

* * * * *